United States Patent [19]

Minami

[11] 3,936,754

[45] Feb. 3, 1976

[54] DEVICE FOR DETECTING THE OPENING OF THROTTLE VALVE OF DIESEL ENGINE FOR VEHICLE

[75] Inventor: Teruo Minami, Yokohama, Japan

[73] Assignee: Kabushiki Kaisha Komatsu Seisakusho, Tokyo, Japan

[22] Filed: June 5, 1974

[21] Appl. No.: 476,728

[30] Foreign Application Priority Data

Nov. 21, 1973 Japan .............................. 48-130129

[52] U.S. Cl. ................ 328/1; 307/247 A; 307/116; 324/168; 335/206

[51] Int. Cl.² ...................... G01H 27/00; H01H 9/00

[58] Field of Search ........ 307/247 A, 116; 324/168; 335/205–207; 328/1

[56] References Cited

UNITED STATES PATENTS

| | | | |
|---|---|---|---|
| 3,036,460 | 5/1962 | White et al. | 324/168 |
| 3,426,303 | 2/1969 | Buckner | 335/206 |
| 3,757,133 | 9/1973 | Arai et al. | 335/206 |
| 3,771,122 | 11/1973 | Sattler | 325/168 |

FOREIGN PATENTS OR APPLICATIONS

| | | | |
|---|---|---|---|
| 1,148,049 | 4/1969 | United Kingdom | 324/168 |

*Primary Examiner*—Stanley D. Miller, Jr.
*Attorney, Agent, or Firm*—Armstrong, Nikaido & Wegner

[57] ABSTRACT

A device for detecting the opening of a throttle valve of a diesel engine for vehicles. The device comprises a magnetic shield adapted to be rotated responsive to the opening of the throttle valve, a magnet adapted to be inserted into the magnetic shield, a plurality of reed switches embedded in the housing, and a plurality of flip-flop circuits adapted to be set or reset for producing a gate signal to be fed to a gate circuit.

4 Claims, 10 Drawing Figures

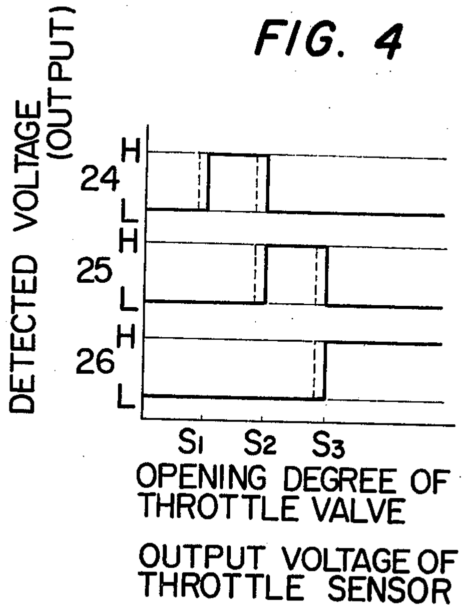
FIG. 4
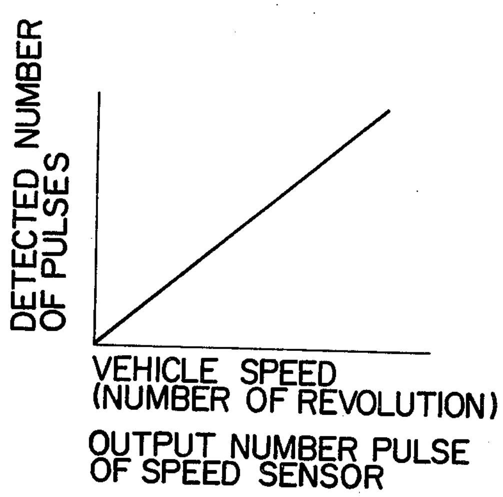
FIG. 5
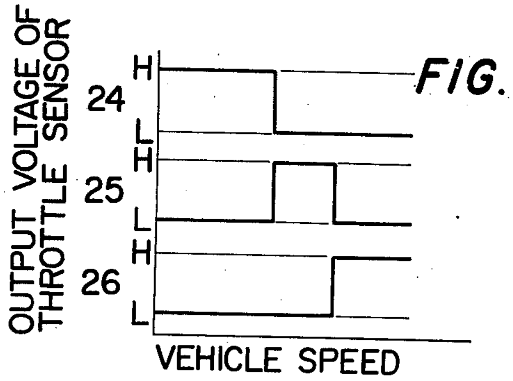
FIG. 6
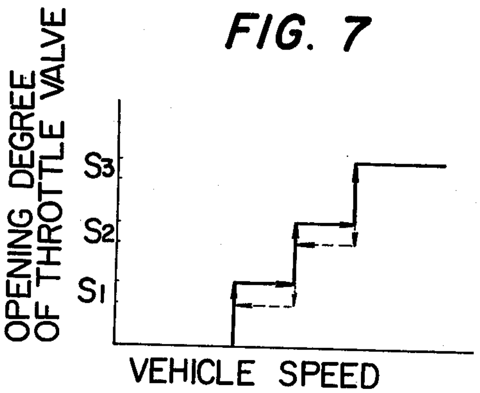
FIG. 7
FIG. 8
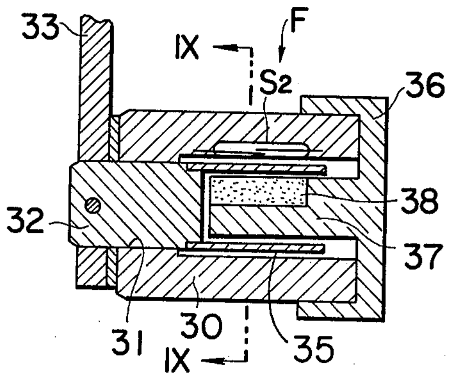
FIG. 9
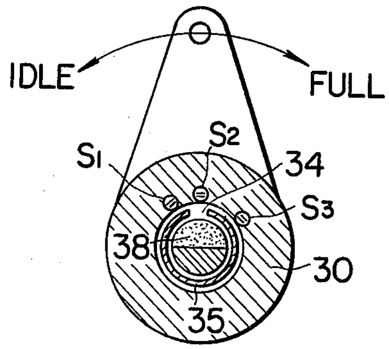
FIG. 10
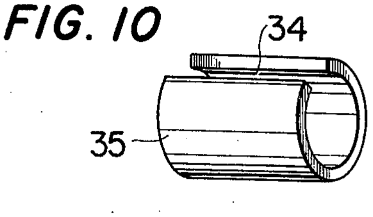

DEVICE FOR DETECTING THE OPENING OF THROTTLE VALVE OF DIESEL ENGINE FOR VEHICLE

BACKGROUND OF THE INVENTION

This invention relates to an electronic control type of an automatic transmission for use in vehicles, and more particularly to a device for detecting the opening of a throttle valve of a diesel engine using a digital control system in the electronic control section thereof.

Generally, it is effective to use a total digital control system to detect the opening of the throttle valve as a step pulse rather than as an analog signal in a transmission with a 1.3 to 1.5 step ratio of the transmission utilized in may diesel engine powered vehicles.

SUMMARY OF THE INVENTION

It is an object of the present invention to provide a device for detecting the opening of the throttle valve in a diesel engine powered vehicle which has a simplified control circuit. The present invention has for its object to employ reed switches having improved endurance as detecting switches, to move a magnetic shield, and to use pulse signals to eliminate an AC converter, thereby enabling the output of a comparator and gate to be detected directly to simplify the construction of the control circuit.

BRIEF DESCRIPTION OF THE DRAWINGS

The above and other objects, features, and advantages of the device for detecting the opening of the throttle valve of a diesel engine according to the present invention will become fully apparent from the following description taken in conjunction with the accompanying drawings, in which:

FIG. 4 is a graph showing the relation between the opening of throttle valve and the output voltage of the sensor;

FIG. 5 is a view for explaining the relation between the vehicle speed and the number of output pulses of the speed sensor;

FIG. 6 is a view for explaining the relation between the vehicle speed and the output voltage of the throttle sensor;

FIG. 7 is a graph for showing clearly the relation between the opening of the throttle valve controlled by the gate circuit and the vehicle speed or the gate output voltage;

FIG. 8 is a longitudinal sectional view of the detecting portion of the throttle sensor;

FIG. 9 is a sectional view of the device taken along the line A—A in FIG. 8; and FIG. 10 is a perspective view of the magnetic shield used in the device of the present invention.

DETAILED DESCRIPTION OF THE PREFERRED EMBODIMENT

Figure 1:
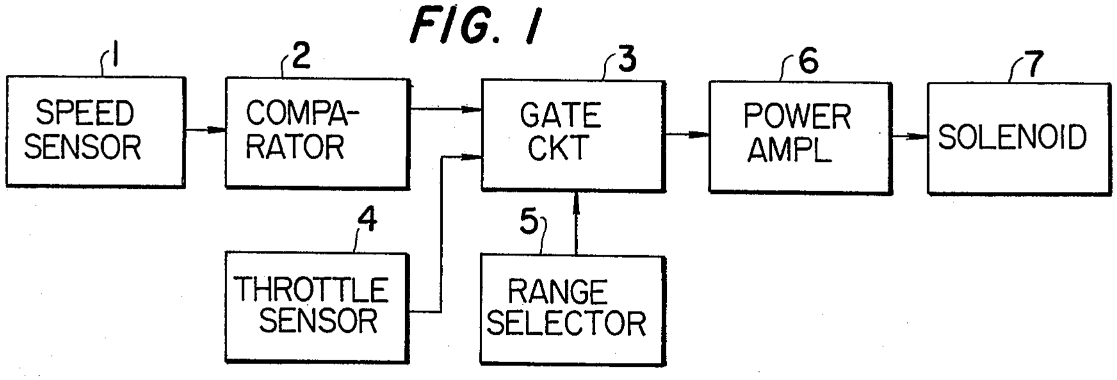
FIG. 1 is a block diagram of the control circuit used in the device of the present invention.

Referring now to the drawings, which show one embodiment of the device of the present invention, reference numeral 1 indicates a speed sensor, which is an electronic circuit for detecting and converting the vehicle speed or the number of revolutions of the engine to either high voltage level H or low voltage level L as represented as the number of the pulses and the relation between the number of detected pulses and the vehicle speed or the number of revolutions of engine is shown in FIG. 5. Reference numeral 2 shows a comparator for comparing the signal from the speed sensor 1 with high and low signals to feed an up signal (logic 1) or down signal (logic 0) to a gate circuit 3, which receives signals from the comparator 2, the throttle sensor 4 and a range selector 5. The output of gate 3 is applied to a power amplifier 6 under a preset condition thereby driving a solenoid 7 of an electro-hydraulic type control circuit for controlling the respective clutches of the transmission (not shown). It is needless to say that these components 3 to 7 must be increased by the corresponding number of stages, if the stages of transmission are increased.

Figure 2:
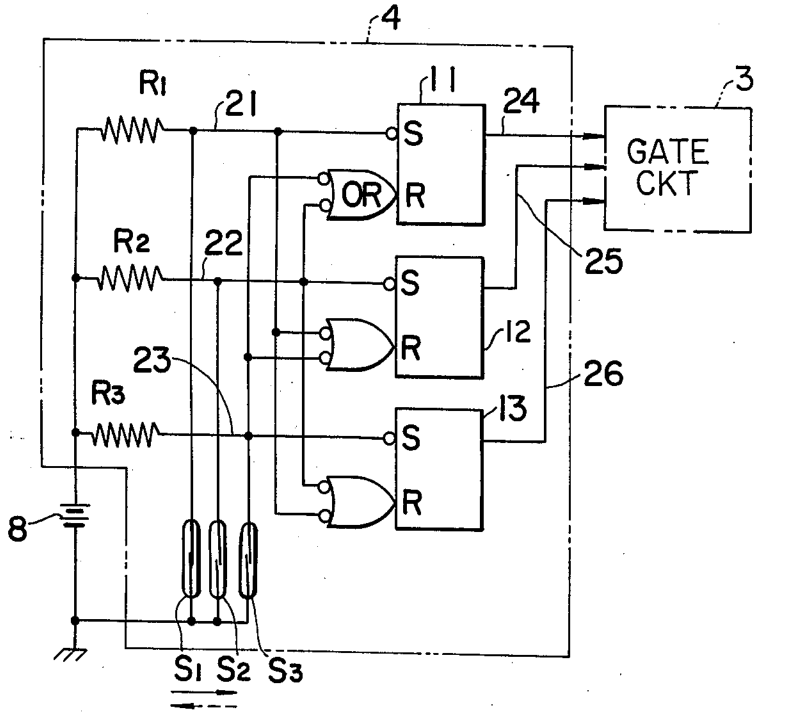
FIG. 2 is a circuit diagram of throttle sensor which forms a principal part of the device of the present invention.

Reference numeral 4 indicates a throttle sensor, which comprises reed switches S1, S2 and S3, resistors R1, R2 and R3, and flip-flop circuits 11, 12 and 13. This sensor is electrically connected to a power supply 8, as shown in FIG. 2. The detecting portion F of the throttle sensor 4 is as shown in FIGS. 8 and 9. This detecting portion F has a housing 30 of a synthetic resin, in which the reed switches S1, S2 and S3 are embedded. A shaft 32 made of a nonmagnetic material is rotatably mounted in the hole 31 of the housing 30, and a lever 33 interlocked with an engine throttle lever is connected to the shaft 32. A magnetic shield 35 having an opening 34 as shown in FIG. 10 is secured to the end of the shaft 32. The housing 30 is fitted within demagnet holder 36, and the shaft portion 37 of the magnet holder 36 is inserted into the magnetic shield 35. A magnet 38 is fixedly secured to the shaft portion 37.

In operation of the device thus constructed, when the opening of the throttle valve is small, the opening 34 of the shield 35 is positioned opposite to the reed switch S1, and therefore only the reed switch S1 is closed by the magnetic force of the magnet 38, while the reed switches S2 and S3 remain opened. Then, the voltage across the line 21 is low level L, and the flip-flop circuit 11 is set so that a signal having high level H is produced at the output line 24. At that time, since the lines 22 and 23 are at high level H, the flip-flop circuits 12 and 13 are reset so that no signal is produced at the lines 25 and 26 (in L state).

When the opening of the throttle valve is increased, the lever 33 is rotated so that the opening 34 of the shield 35 faces opposite to the reed switch S2. As a result, the reed switch S1 is opened (OFF), and the reed switch S2 is closed (ON). Accordingly, the voltage across the line 21 becomes high level H, the voltage across the line 22 becomes low level, and the voltage across the line 23 becomes high level H so that the flip-flop circuit 11 is reset, and the flip-flop circuit 12 is set. The flip-flop circuit 13 is reset.

Figure 3:
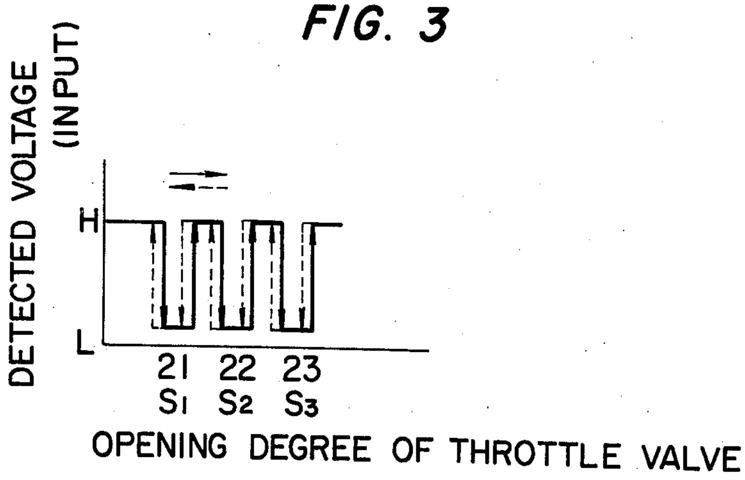
FIG. 3 is a graph showing the relation between the detected input voltage of the flip-flop and the opening of throttle valve.

The relation between the opening of the throttle valve and the detected input voltages across the lines 21, 22 and 23 is as shown in FIG. 3, and the relation between the detected output voltages across the lines 24, 25 and 26 and the opening of the throttle valve is as shown in FIG. 4. The broken lines in FIGS. 3 and 4 show the deviation due to the hysteresis of the reed switches. Since the opening of the throttle valve of the engine must be increased in order to increase the vehicle speed, the relation between the vehicle speed and the output voltage of the throttle sensor is shown in FIG. 6, and the relation between the opening of the throttle valve and the vehicle speed is shown in FIG. 7.

As mentioned hereinabove, the device for detecting the opening of a throttle valve of a diesel engine according to the present invention is characterized in that the device comprises a magnetic shield 35 having an opening 34 in the periphery thereof, said magnetic shield being mounted within a housing 30 so as to rotate in response to the opening of the throttle valve. A magnet 38 is adapted to be inserted in the magnetic shield 35 and secured to the housing 30. A plurality of reed switches S1, S2 and S3 are embedded in the housing 30 and are adapted to be opened and closed by the magnetism of the magnet 38, and flip-flop circuits 11, 12 and 13 adapted to be set or reset by the opening and closing of said reed switches for producing gate signals to be fed to the gate circuit 3.

Accordingly, the device of the present invention employs durable reed switches S1, S2 and S3 as detecting switches to detect movement of the magnetic shield 35 and uses pulse signal to eliminate an A-D converter thus enabling the output of the comparator and gate circuit to be directly detected to simplify the construction of the control circuit.

What is claimed is:

1. A device for detecting the opening of a throttle valve of a diesel engine, said device comprising a housing; a magnetic means positioned within said housing; a plurality of switch means positioned within said housing; magnetic shield means positioned between said magnetic means and said plurality of switch means, said magnetic shield means having a gap therein such that a said magnetic means operates one of said plurality of switch means corresponding to the position of said gap, and wherein the position of said gap is a function of the position of said throttle valve; and a plurality of bistable circuit means, each bistable circuit means having a set input coupled to a corresponding one of said switch means and a reset input coupled to all of the others of said switch means, wherein the operation of one of said switch means sets the corresponding bistable circuit means and resets all of the other bistable circuit means, whereby the position of said throttle valve produces a corresponding output in said bistable circuit means.

2. The device of claim 1, wherein said magnetic shield means includes a shaft coupled to said throttle valve and a magnetic shield mounted on said shaft, wherein the gap in said shield rotates.

3. The device of claim 2, wherein each said switch means comprises a reed switch, said reed switches being positioned along a circle concentric with said shaft.

4. The device of claim 2, wherein each said bistable circuit means is a flip-flop.

* * * * *